US011920975B2

(12) United States Patent
Ip et al.

(10) Patent No.: US 11,920,975 B2
(45) Date of Patent: Mar. 5, 2024

(54) REPEATER DESIGN FOR DISTRIBUTED ACOUSTIC SENSING ON MULTISPAN FIBER LINKS

(71) Applicant: NEC Laboratories America, Inc., Princeton, NJ (US)

(72) Inventors: Ezra Ip, West Windsor, NJ (US); Yue-Kai Huang, Princeton, NJ (US); Fatih Yaman, Princeton, NJ (US); Shinsuke Fujisawa, Princeton, NJ (US)

(73) Assignee: NEC Corporation, Tokyo (JP)

( * ) Notice: Subject to any disclaimer, the term of this patent is extended or adjusted under 35 U.S.C. 154(b) by 495 days.

(21) Appl. No.: 17/314,006

(22) Filed: May 6, 2021

(65) Prior Publication Data

US 2021/0356316 A1 Nov. 18, 2021

Related U.S. Application Data

(60) Provisional application No. 63/023,286, filed on May 12, 2020.

(51) Int. Cl.
*G01H 9/00* (2006.01)
*H04B 10/071* (2013.01)
*H04Q 11/00* (2006.01)

(52) U.S. Cl.
CPC ........... *G01H 9/004* (2013.01); *H04B 10/071* (2013.01); *H04Q 11/0005* (2013.01); *H04Q 11/0067* (2013.01); *H04Q 2011/0016* (2013.01); *H04Q 2011/0083* (2013.01); *H04Q 2213/13191* (2013.01)

(58) Field of Classification Search
USPC ......................................................... 73/653
See application file for complete search history.

(56) References Cited

U.S. PATENT DOCUMENTS

| 11,237,025 | B2 * | 2/2022 | Issa ..................... G01D 5/35358 |
| 2020/0158543 | A1 * | 5/2020 | Koste ................. G01D 5/35358 |
| 2022/0113169 | A1 * | 4/2022 | Issa ......................... G01H 9/004 |

* cited by examiner

*Primary Examiner* — Clayton E. LaBalle
*Assistant Examiner* — Warren K Fenwick
(74) *Attorney, Agent, or Firm* — Joseph Kolodka

(57) ABSTRACT

Aspects of the present disclosure are directed to alternative repeater design(s) that advantageously improve signal-to-noise of distributed acoustic sensing (DAS) systems using coherent detection of Rayleigh backscatter in multi-span links including inline amplification that may be employed—for example—in undersea submarine systems. The repeater designs incorporate Rayleigh combine units (RCU) and Rayleigh drop units (RDU) to reduce Rayleigh backscatter loss as Rayleigh signal(s) is/are routed to a link that propagates the backscatter signal in an opposite direction relative to interrogation pulse(s).

10 Claims, 7 Drawing Sheets

REPEATER DESIGN FOR DISTRIBUTED ACOUSTIC SENSING ON MULTISPAN FIBER LINKS

CROSS REFERENCE

This disclosure claims the benefit of U.S. Provisional Patent Application Ser. No. 63/023,286 filed May 12, 2020 the entire contents of which is incorporated by reference as if set forth at length herein.

TECHNICAL FIELD

This disclosure relates generally to distributed fiber optic sensing and more particularly to distributed acoustic sensing on multi-span fiber links.

BACKGROUND

As is known, distributed fiber optic sensing (DFOS) and more particularly distributed acoustic sensing has shown great utility when applied to any number of important applications. Given such important applicability, improvements in distributed acoustic sensing would represent a welcome advance in the art.

SUMMARY

An advance in the art is made according to aspects of the present disclosure directed to systems, methods, and structures providing enhanced signal-to-noise characteristics on multi-span fiber links supporting distributed acoustic sensing.

In sharp contrast to the prior art, systems, methods, and structures according to aspects of the present disclosure employ a novel submarine repeater that incorporates Rayleigh combine units (RCU) and Raleigh drop units (RDU) which advantageously reduce the loss of a Rayleigh backscatter signal by routing it to an adjacent counter-propagating optical link located preferably in a same submarine cable as a sensing fiber. Surprisingly, such arrangement dramatically improves signal-to-noise ratio (SNR) of the Rayleigh backscatter as received by an interrogator, thus improving the performance of acoustic detection by increasing sensitivity and/or extending achievable sensing range. The RCU and RDU are also designed to minimize the insertion loss seen by the telecommunications signals that co-propagate with the dedicated sensing channel.

In further contrast to the prior art and instead of a prior art configuration wherein passive couplers interconnect outputs of erbium-doped fiber amplifiers (EDFAs) in each direction, Rayleigh combine units (RCU) and Raleigh drop units (RDU) according to other aspects of the present disclosure incorporate optical bandpass filters, optical multiplexers/demultiplexers, low-cost switches and photodiodes to minimize both a loss experienced by the Rayleigh backscatter and any insertion loss associated with co-propagating telecommunications channels.

BRIEF DESCRIPTION OF THE DRAWING

A more complete understanding of the present disclosure may be realized by reference to the accompanying drawing in which.

Figure 1:
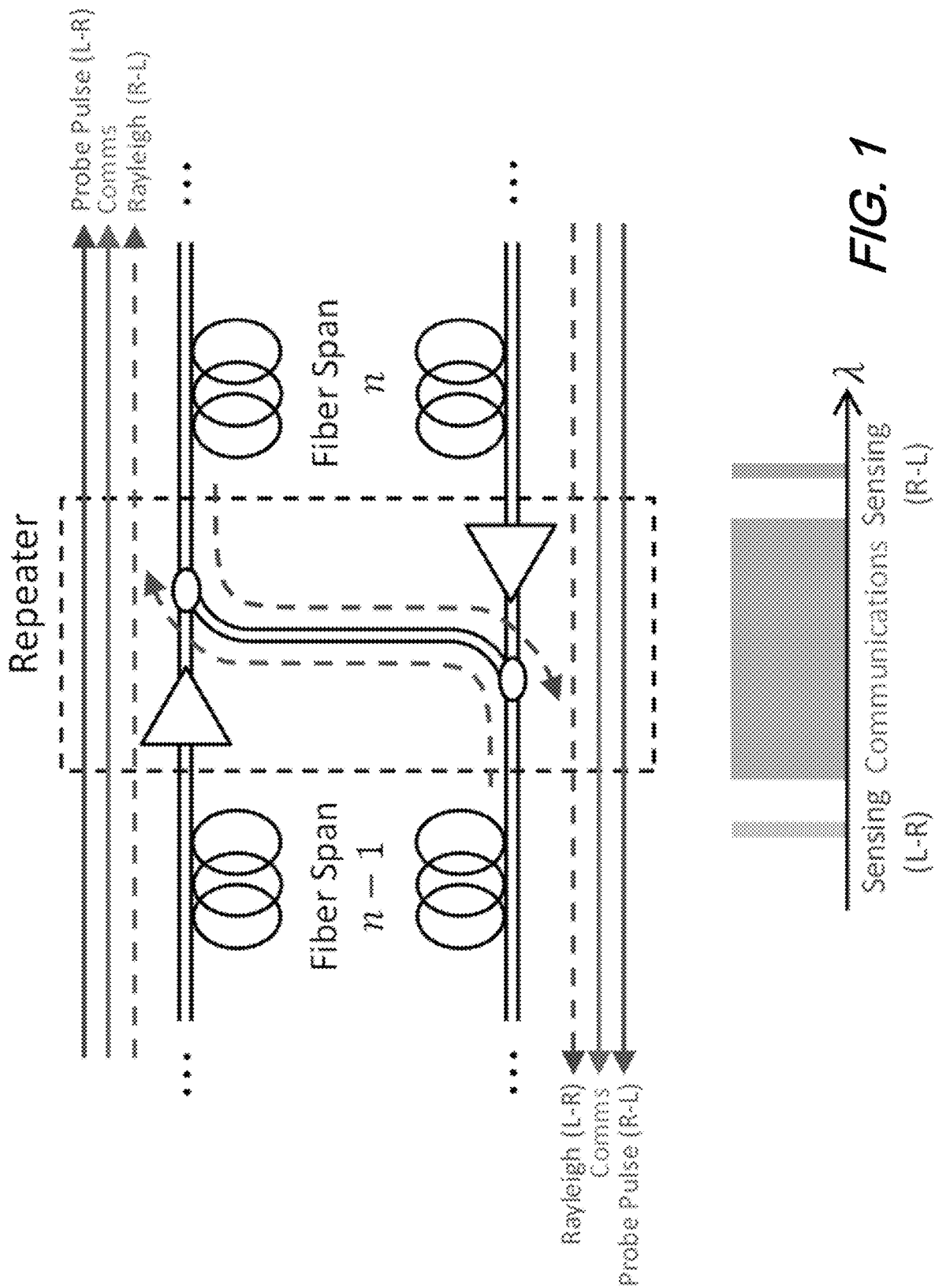
FIG. 1 shows a schematic diagram of an illustrative repeater architecture employed in a bidirectional fiber link that allows simultaneous distributed acoustic sensing in both directions as well as data transmission according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that distributed fiber optic sensing (DFOS) is an important and widely used technology to detect environmental conditions such as temperature (distributed temperature sensing—DTS), vibration (distributed vibration sensing—DVS), stretch level etc. anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

Distributed acoustic sensing (DAS) employing coherent detection of Rayleigh backscatter in multi-span fiber links with inline amplification is difficult to implement due—in part—to a low optical signal-to-noise ratio. As inline amplifiers have isolators, existing DAS-enabled submarine cables employ couplers to route the Rayleigh backscatter to a different fiber which in turn carries a return signal in an opposite direction to an interrogator pulse. The additive combination of coupler losses plus fiber span loss before amplification results in a low SNR. As we shall show and describe, our inventive repeater design and implementation substantially eliminates such excess loss that plagues the prior art.

Coherent optical time-domain reflectometry (OTDR) using Rayleigh backscatter is a well-known method for Distributed Acoustic Sensing (DAS), and has been demonstrated on un-amplified fiber links as well as un-repeated fiber links assisted by forward Raman amplification and remote optically pumped amplifiers (ROPA). Like data transmission, achievable range of such systems is limited by optical signal-to-noise ratio (OSNR).

Recently, it has been proposed to implement DAS over long-haul fiber optic links having inline amplification using erbium-doped fiber amplifiers (EDFAs). Due to the presence of isolators at outputs of EDFAs, Rayleigh backscatter must be routed to a different fiber which supports propagation in the opposite direction to interrogation signals for the interrogator to receive returned sensing signal(s). This is possible when fiber cables provide bidirectional transmission, as is commonly the case in both terrestrial and submarine systems.

FIG. 1 shows a schematic diagram of an illustrative repeater architecture employed in a bidirectional fiber link that allows simultaneous distributed acoustic sensing in both directions as well as data transmission as known in the art.

As illustratively shown in the figure, the prior art repeater configuration includes couplers connecting outputs of two counter-propagating EDFAs at every repeater. The Rayleigh backscatter generated by the probe pulse traveling in the L-R direction on fiber span n is routed by the couplers back to the interrogator via the R-L link.

Figure 2:
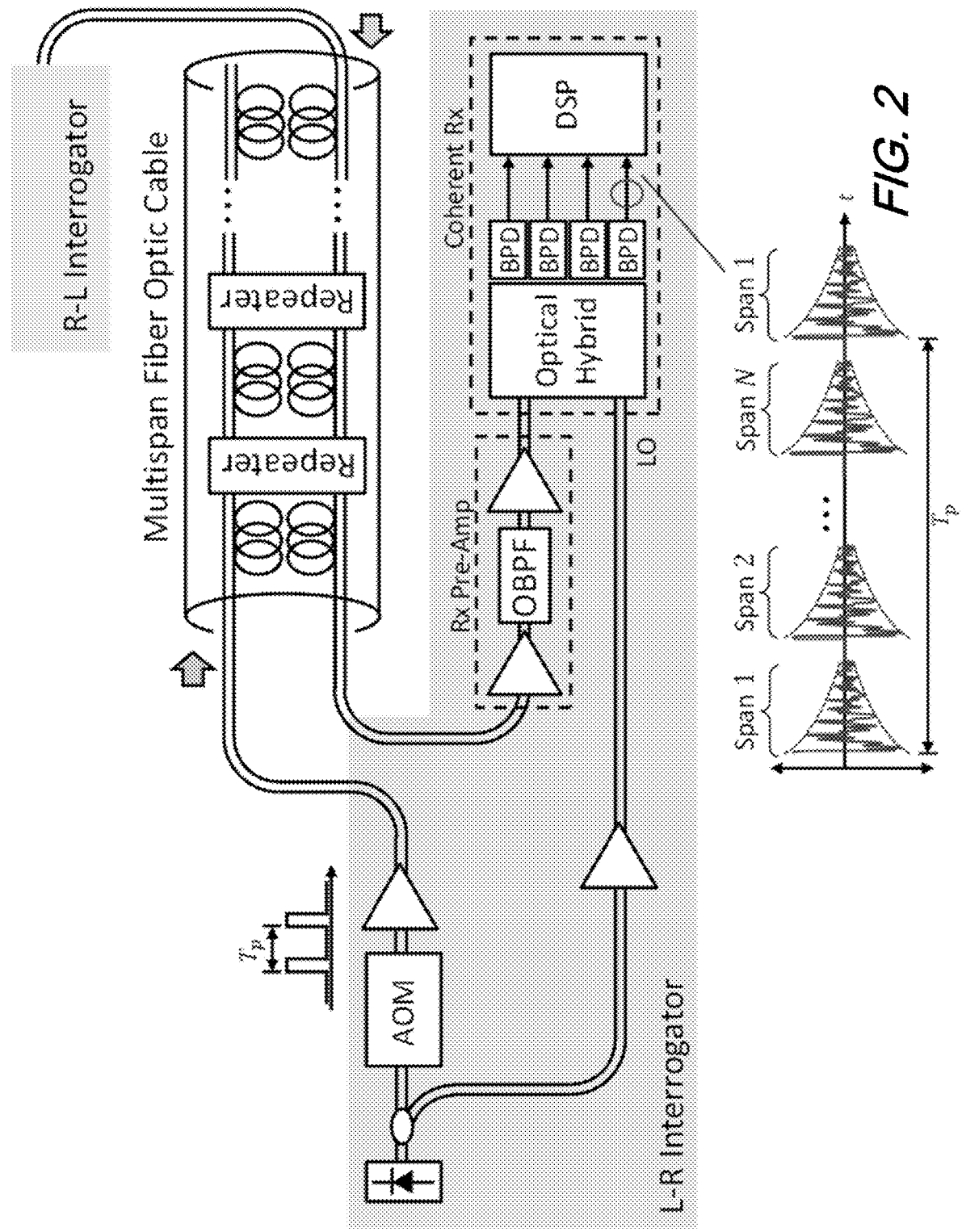
FIG. 2 shows a conventional DAS architecture for a multispan fiber link.

FIG. 2 shows a conventional DAS architecture for a multi-span fiber link. As compared with a conventional, prior art DAS configuration for an unamplified link which uses a circulator to simultaneously launch interrogator probe pulses into an optical sensing fiber while receiving the Rayleigh backscatter via a return port of the circulator. As shown in this figure however, the Rayleigh backscatter is received via a different fiber.

Those skilled in the art will readily appreciate and understand that one problem with the repeater configuration illustratively shown in FIG. 1 is that the Rayleigh backscatter must pass through two couplers as well as an entire fiber span n−1 before it is amplified. The combined loss is normally in the range of 25-35 dB. As the Rayleigh backscatter is already weak, these insertion losses make the resulting sensing signal undetectable.

For a submarine fiber cable where all the spans are of substantially equal length, and the gains of the EDFAs exactly equal the span losses, it can be shown that the minimum signal-to-noise ratio (SNR) of coherent OTDR is:

$$SNR_{min} = \frac{G_{code}\alpha_c^2\xi P_{tx}T_s\left(\frac{c}{2n_{eff}}\right)e^{-2\alpha L}}{\alpha_c^2\xi \frac{1}{2\alpha}[1-e^{-2\alpha L}]\frac{N_{span}(N_{span}+1)}{2}N_0 + N_{span}N_0}, \quad (1)$$

where $\alpha$ is fiber attenuation, $n_{eff}$ is the effective index of propagation, L is the span length, $\xi$ is the Rayleigh scattering coefficient (typically on order of −70 to −80 dB/m), and $\alpha_c$ is the split ratio of the couplers shown in FIG. 1.

We note that peak power and duration of the probe pulses are $P_{tx}$ and $T_s$, respectively, while $G_{code}$ is the coding gain (assuming the transmission of a coded sequence of pulses rather than an individual pulse). The variance of the amplified spontaneous emission (ASE) noise added by each EDFA within the bandwidth of the probe pulse is given by:

$$N_0=2hv(F-1)G/T_s.$$

The first term in the denominator of Eq. (1) comes from ASE noise added by amplifiers in the forward propagating (L-R) direction being reflected by Rayleigh scattering. The second term in the denominator comes from ASE noise added by the EDFAs in the return path (R-L).

Figure 3:
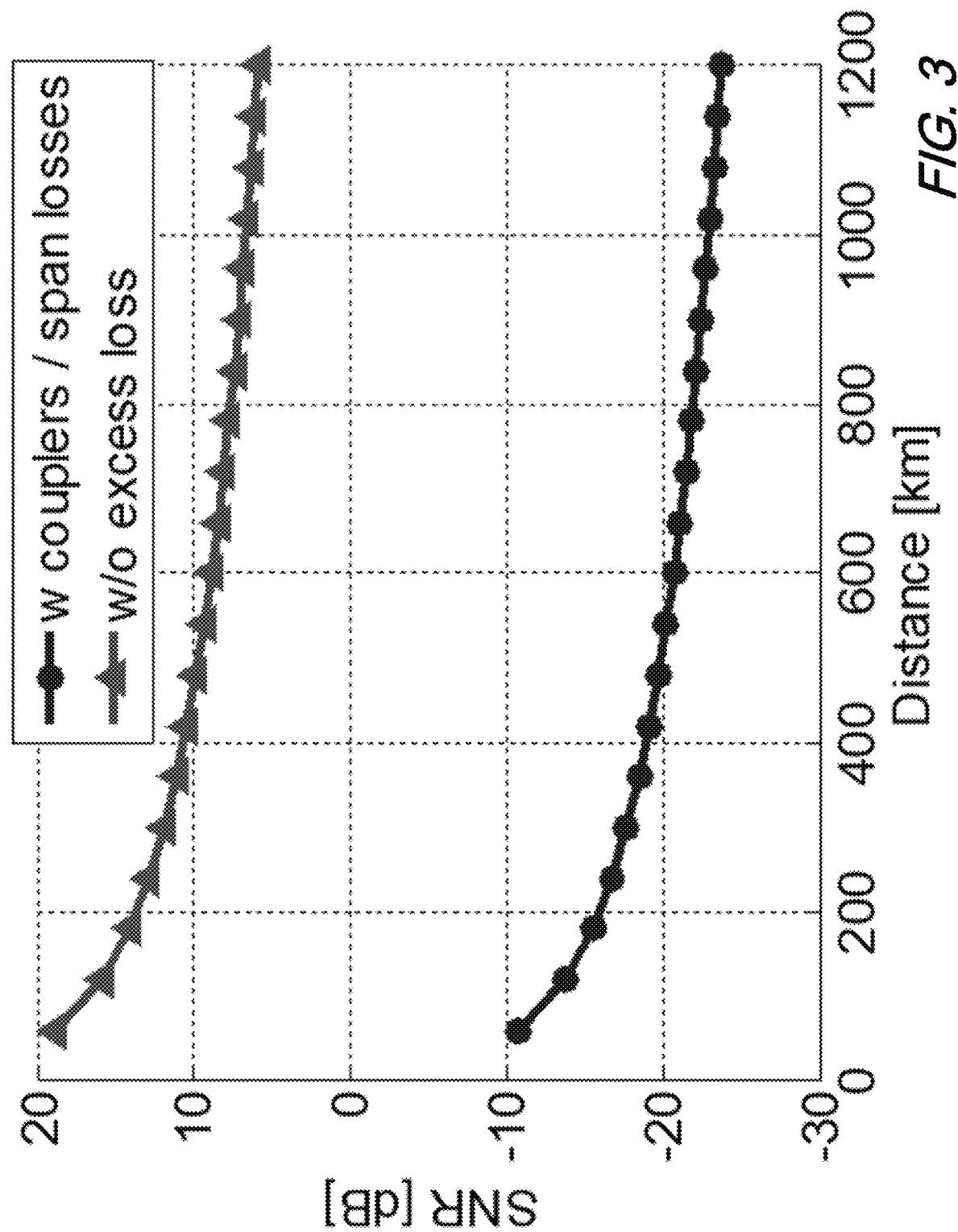
FIG. 3 shows a plot/spectrum of simulated SNR vs transmission distance for coherent OTDR over a multi-span fiber link with and without coupler and span loss before Rayleigh backscatter is amplified according to aspects of the present disclosure.

FIG. 3 shows a plot/spectrum of simulated SNR vs transmission distance for coherent OTDR over a multi-span fiber link with and without coupler and span loss before Rayleigh backscatter is amplified according to aspects of the present disclosure. We note that the plot assumes 60-km spans of standard pure silica core fiber with an attenuation of 0.16 dB/km and Rayleigh coefficient of −76 dB/m. The probe pulses are assumed to have peak power of 0 dBm, and a pulse duration of 100 ns allows DAS at a spatial resolution of 10 m, and $G_{code}$=20 dB was assumed. The EDFAs have noise figures of 5 dB, and 10% couplers are used for the fiber link.

Note that we observed that when Rayleigh backscatter has to pass through the two couplers and span loss before amplification, SNR is below 0 dB even after just one span. Advantageously however, our new repeater configuration according to aspects of the present disclosure advantageously removes these losses before amplification, resulting in a large improvement in SNR by ~30 dB.

Figure 4:
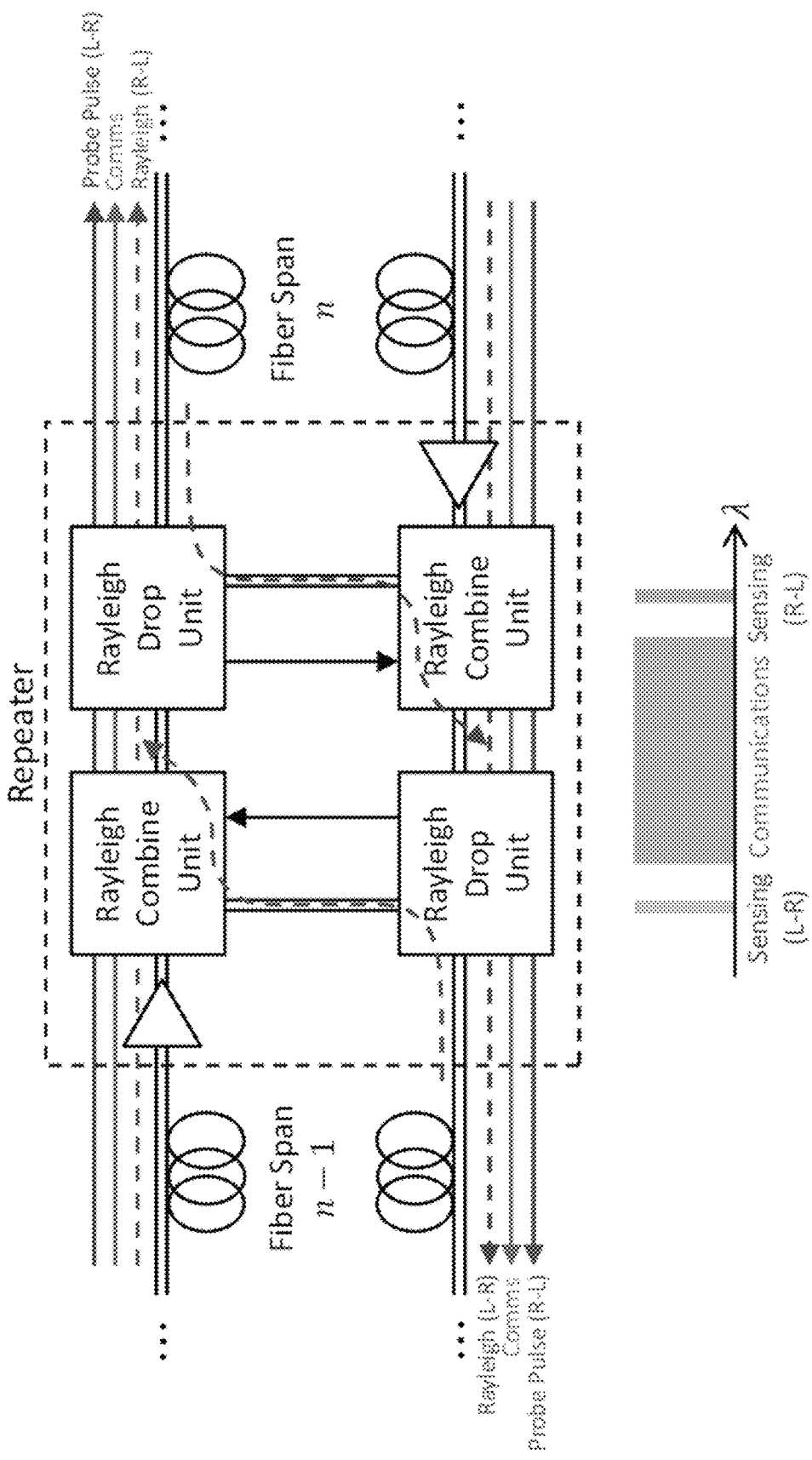
FIG. 4 shows a schematic diagram of an illustrative improved configuration for repeater architecture that exhibits improved SNR of coherent OTDR according to aspects of the present disclosure.

FIG. 4 shows a schematic diagram of an illustrative improved configuration for repeater architecture that exhibits improved SNR of coherent OTDR according to aspects of the present disclosure. As illustratively shown in that figure, in each direction, there is a "Rayleigh combine unit" (RCU) followed by the "Rayleigh drop unit" (RDU) after the EDFA.

Consider a propagation of probe pulse(s), communications signal(s), and Rayleigh backscatter signal(s) using a point of view where the L-R direction is the "forward" direction. The RDU directs the Rayleigh backscatter carried by fiber span n to the R-L link propagating in a backward direction. One of numerous equivalent implementation(s) of the RDU is shown illustratively in FIG. 5.

Figure 5:
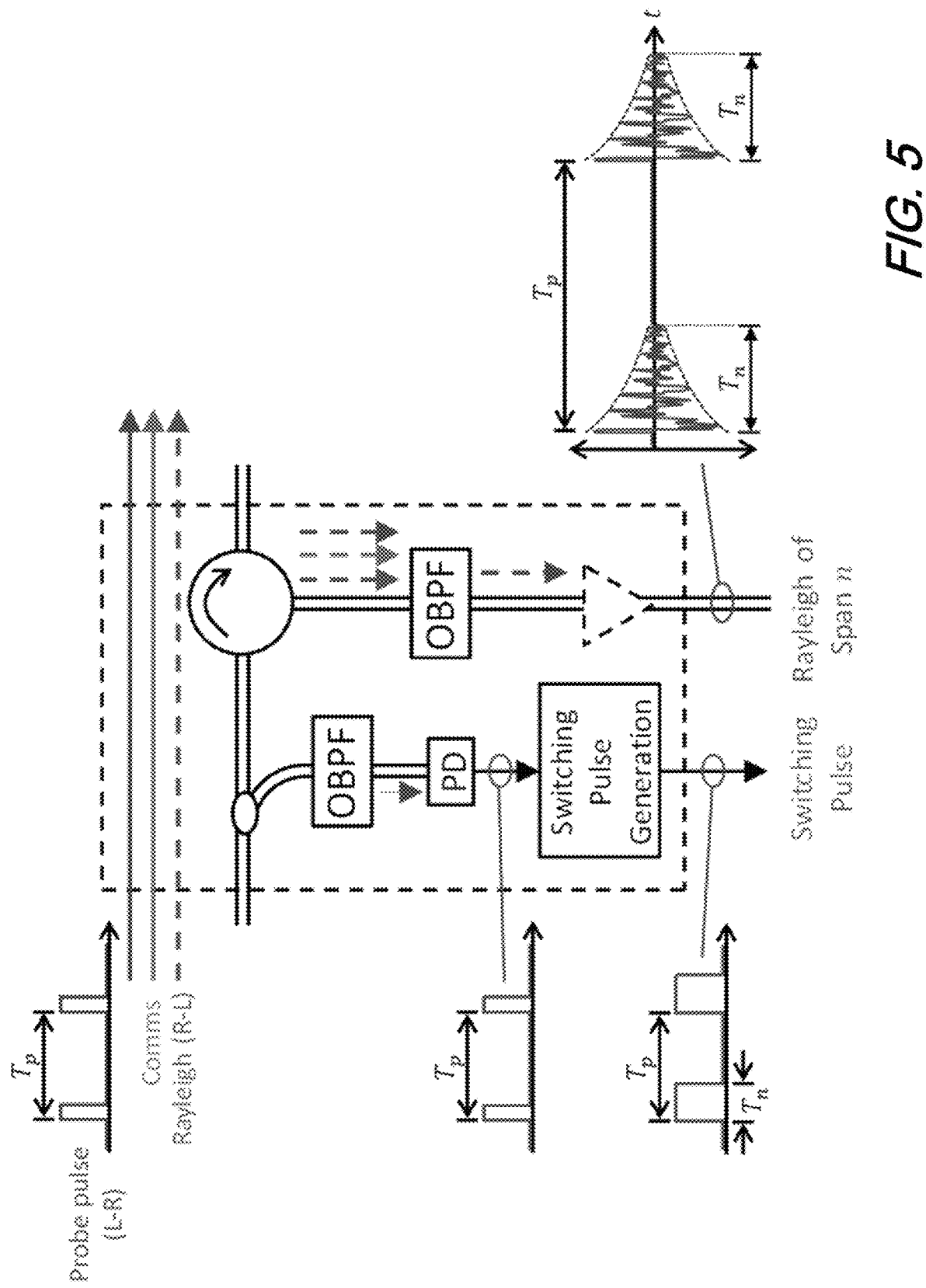
FIG. 5 shows a schematic diagram of an illustrative Rayleigh Drop Unit (RDU) whose function is to drop the Rayleigh backscatter of a next span, while providing a switching pulse for the RCU for link propagating in an opposite direction according to aspects of the present disclosure.

As may be observed, FIG. 5 shows a schematic diagram of an illustrative Rayleigh Drop Unit (RDU) whose function is to drop the Rayleigh backscatter of a next span, while providing a switching pulse for the RCU for link propagating in an opposite direction according to aspects of the present disclosure.

Operationally, the Rayleigh backscatter is provided to the RCU of the R-L link, which combines it with the Rayleigh backscatter of all upstream spans n+1 to $N_{span}$. One of numerous equivalent implementation(s) of the RCU is illustratively shown in FIG. 6.

Figure 6:
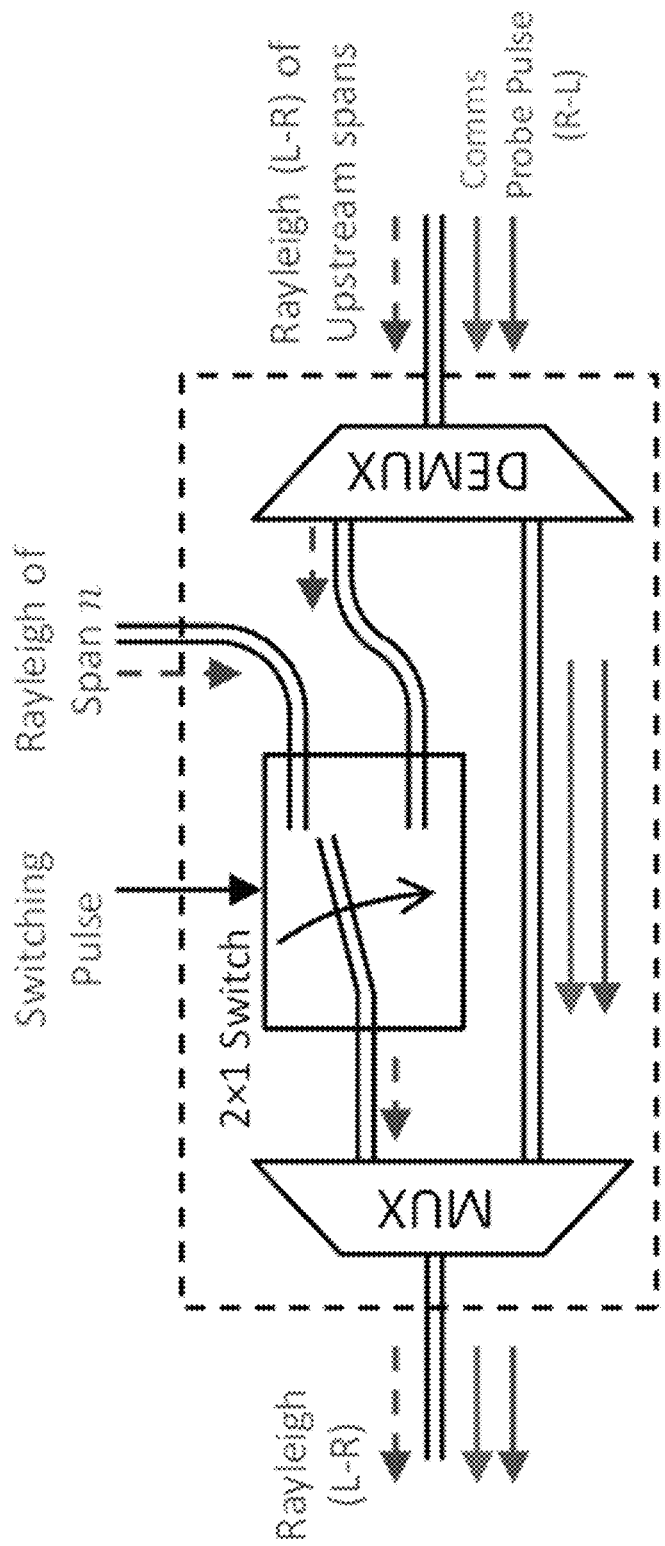
FIG. 6 shows schematic diagram of an illustrative Rayleigh Combine Unit (RCU) whose function is to allow a probe pulse and communications signal to pass, while inserting Rayleigh backscatter of a most recent span with Rayleigh backscatter of upstream spans—from the point of view of the link propagating in the opposite direction according to aspects of the present disclosure.

FIG. 6 shows schematic diagram of an illustrative Rayleigh Combine Unit (RCU) that in operation allows a probe pulse and communications signal to pass, while inserting Rayleigh backscatter of a most recent span with Rayleigh backscatter of upstream spans—from the point of view of the link propagating in the opposite direction according to aspects of the present disclosure.

Note that in the RDU configuration illustratively shown in FIG. 5, a circulator allows the forward-propagating probe pulse, communications signal and Rayleigh backscatter of the R-L link to continue in the L-R direction. Each of these forward-propagating wavelengths produce its own respective Rayleigh backscatter, which is/are routed to the drop port of the circulator and are shown by respective dotted arrows in the figure. An optical bandpass filter (OBPF) selects a component of interest, which is produced by the probe pulse. An optional amplifier may be inserted to raise the power of the dropped backscatter to a desired level, since this signal must pass through the RCU, RDU and fiber span n−1 on the adjacent link before it is amplified.

In addition to dropping the optical backscatter signal(s), the RDU provides a switching pulse for the RCU on the R-L link.

Consider a situation wherein the L-R probe pulse arrives at the input of fiber span n at time $t_n$. The Rayleigh backscatter of span n will exist from $t_n$ to $t_n+2T_n$, where $T_n=(n_{eff}/c)L_n$ is the propagation delay of that span.

Meanwhile, the probe pulse arrives at the input of fiber span n+1 at time $t_n+T_n$, and the Rayleigh backscatter of span n+1 starts no earlier than $t_n+2T_n$, which is after the Rayleigh backscatter of span n has ended. It is assumed here that the delay of the amplifier, RCU and RDU are negligible.

The RDU assists the RCU of the R-L link by providing a switching pulse with duration from $t_n$ to $t_n+2T_n$. During this time, the RCU of the R-link will let through optical output of the RDU; at other times, it will let through the Rayleigh backscatter of upstream spans n+1 to $N_{span}$.

The switching pulse can be generated by tapping a portion of the L-R signal using a coupler as shown in FIG. 5 and using an OBPF to select the probe pulse. Since the pulse duration T is much narrower than $T_n$, a "switching pulse generation" (SPG) unit is required to stretch the pulse to the correct duration. Advantageously, the SPG unit may be implemented using either analog or digital electronics.

An illustrative implementation of an RCU is shown in FIG. 6. As previously noted, the RCU functions to allow the R-L probe pulse and the R-L communications signal to pass through, while combining the Rayleigh backscatter of span n in the L-R with the Rayleigh backscatter created by spans n+1 to $N_{span}$ in the L-R Link. As those skilled it the art will appreciate, this can be accomplished using a wavelength multiplexer (MUX), a wavelength demultiplexer (DEMUX) and a 2×1 switch. In such configuration, the MUX and DEMUX separates Rayleigh backscatter of the L-R link from other wavelengths.

Those skilled in the art will readily understand and appreciate that benefits of our arrangements/architectures/configurations illustratively shown in FIG. 4, FIG. 5, and FIG. 6 are numerous. First, components in the RCU and RDU are chosen to minimize insertion loss as seen by the communications signal. This advantageously reduces loss in power efficiency at the repeaters as a result of supporting DAS. For example, the circulator in the RCU can have been replaced with a coupler, but this will increase the insertion loss on the communications signal, as well as reduce the power of the Rayleigh backscatter handed over to the RCU, which will make DAS more susceptible to noise.

Another benefit that will be appreciated by those skilled in the art is that by placing the RCU and RDU after the amplifier, their contributed insertion losses may be overcome by increasing the output power of the EDFA only slightly. As the communications signal still arrives at the EDFA input at the same power both with and without DAS, there is no loss in transmission reach.

Finally, by using a 2×1 switch to combine the Rayleigh backscatter of the most recent span with upstream spans, systems, methods, and structures according to aspects of the present disclosure advantageously minimize insertion loss seen by each. We note that while it is possible to replace the switch with a coupler, such an arrangement will likely increase insertion loss, causing reduction in SNR for the DAS channel.

Note that as presented herein, wavelengths assigned for the communications channels, the L-R DAS and R-L DAS are arbitrary. The illustrative assignment shown in FIG. 4 simplifies the design of the MUX and DEMUX at the RCU, as the through-channels are always on the same side in frequency.

We note that a possible disadvantage of a repeater architecture according to aspects of the present disclosure and as illustratively shown herein, is that the Rayleigh backscatter of fiber span n created by the L-R probe pulse needs to pass through the RDU of the L-R link, the RCU and RDU of the R-L link, and fiber span n−1 before it is amplified. While the insertion losses of the RCU and RDU (caused by the circulator, OBPF, switch and DEMUX) can be minimal, the fiber attenuation of span n−1 can be large. This may result in an unacceptable OSNR for the DAS operation.

In FIG. 5, an optional EDFA was shown in the RDU. Boosting the power at this point will help improve OSNR of the sensing channel at the expense of increasing the power requirement on the repeater. Since the Rayleigh backscatter power is weak compared with the communications channels, the additional pump power needed should be negligible. The pump for this optional EDFA may also come from unextinguished pump of the inline R-L EDFA shown illustratively in FIG. 4.

Figure 7:
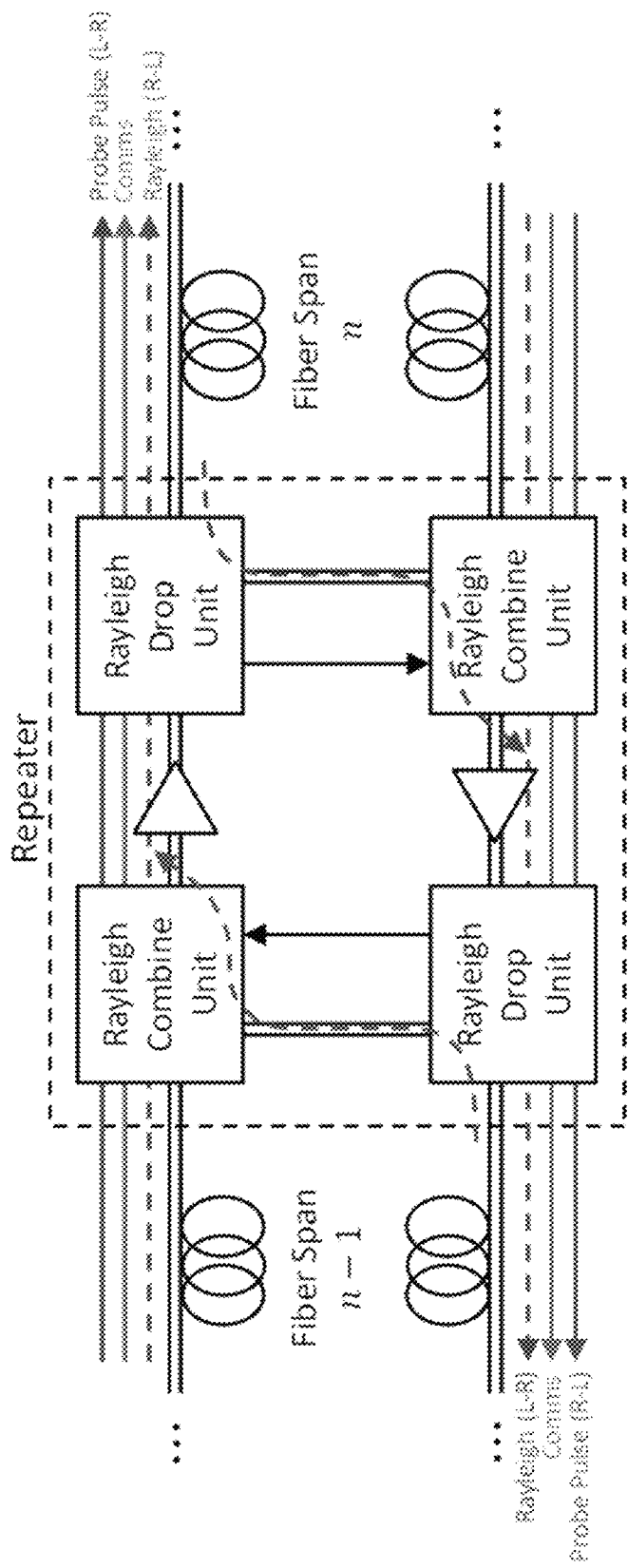
FIG. 7 shows schematic diagram of an illustrative alternative architecture wherein the RCU is positioned before inline amplifier and the Rayleigh backscatter is dropped by the RDU which advantageously avoids an extra span loss before it is amplified according to aspects of the present disclosure.

It is also possible to avoid the additional EDFA in the RDU by putting the RCU before the inline amplifier as shown in the alternative architecture in FIG. 7, which shows schematic diagram of an illustrative alternative architecture wherein the RCU is positioned before inline amplifier and the Rayleigh backscatter is dropped by the RDU and advantageously avoids an extra span loss before it is amplified according to aspects of the present disclosure.

We note that such an alternative architecture trades off a slight reduction in the power of the communications channels before amplification (thus slightly sacrificing transmission reach) in order to avoid the large fiber attenuation of span n−1 for the Rayleigh backscatter.

While we have presented this disclosure using some specific examples, those skilled in the art will recognize that our teachings are not so limited. Accordingly, this disclosure should be only limited by the scope of the claims attached hereto.

The invention claimed is:

1. A distributed optical fiber sensing/distributed acoustic sensing system comprising:
    a length of bi-directional optical fiber cable having multiple spans of fibers with inline optical amplifiers positioned after each span, said cable configured such that at least one fiber propagates light in a first direction and at least one fiber propagates light in a second direction, said second direction counter-propagating opposite to the first direction;
    a distributed optical fiber sensing/distributed acoustic sensing interrogator in optical communication with the length of bi-directional optical fiber cable including a fiber that propagates light in the first direction and a fiber that propagates light in the second direction;
    an intelligent analyzer configured to analyze DFOS sensing data received by the DFOS interrogator system; and
    one or more repeaters located at point(s) along the length of the optical fiber cable, said repeaters including a plurality of Rayleigh combine units (RCUs) and a plurality of Rayleigh drop units (RDUs).

2. The sensing system of claim 1 wherein the RCUs and RDUs are configured to operate in combination to selectively route Rayleigh backscatter to an optical fiber propagating in an opposite direction.

3. The sensing system of claim 2 wherein the RDUs are configured to pass probe pulses, communications signals and Rayleigh backscatter of a counterpropagating fiber, while dropping Rayleigh backscatter resulting from the probe pulses.

4. The sensing system of claim 3 wherein the RDUs are configured to provide a switching pulse to an RCU on a counterpropagating fiber.

5. The sensing system of claim 4 wherein the RCU is configured to pass the probe pulses and communications signals and receive Rayleigh backscatter dropped by the RDU on the counterpropagating fiber, said RCU configured to respond to the switching pulse provided by the RDU to combine the Rayleigh backscatter in an adjacent span with Rayleigh backscatter generated in upstream spans of the same counterpropagating fiber.

6. The sensing system of claim 5 wherein the RDU includes an optical circulator to route optical signals and an optical bandpass filter to extract Rayleigh backscatter corresponding to probe pulse(s).

7. The sensing system of claim 6 wherein the RDU includes an optical amplifier that amplifies Rayleigh backscatter before dropping it to the RCU.

8. The sensing system of claim 7 wherein the RCU includes wavelength multiplexers and demultiplexers to extract Rayleigh backscatter of the counterpropagating fiber from probe pulse(s) and communications signals.

9. The sensing system of claim 8 wherein the RDU and RCU are positioned at a point of the cable after an inline optical amplifier.

10. The sensing system of claim 7 wherein the RCU is positioned at a point of the cable before an inline optical amplifier while the RDU is positioned at a point of the cable after the inline optical amplifier.

* * * * *